(12) United States Patent
Hill et al.

(10) Patent No.: US 10,538,598 B2
(45) Date of Patent: Jan. 21, 2020

(54) PHOSPHONIUM-CROSSLINKED CHITOSAN AND METHODS FOR USING AND PRODUCING THE SAME

(71) Applicant: UTI Limited Partnership, Calgary (CA)

(72) Inventors: Josephine M. Hill, Calgary (CA); Sebastian Sessarego, Calgary (CA)

(73) Assignee: UTI Limited Partnership, Calgary, Alberta (CA)

(*) Notice: Subject to any disclaimer, the term of this patent is extended or adjusted under 35 U.S.C. 154(b) by 140 days.

(21) Appl. No.: 15/844,470

(22) Filed: Dec. 15, 2017

(65) Prior Publication Data
US 2019/0185588 A1 Jun. 20, 2019

(51) Int. Cl.
| | | |
|---|---|---|
| *C08B 37/00* | (2006.01) |
| *C08B 37/08* | (2006.01) |
| *B01J 39/18* | (2017.01) |
| *B01J 20/24* | (2006.01) |
| *C02F 1/28* | (2006.01) |
| *B01D 15/36* | (2006.01) |
| *C02F 1/42* | (2006.01) |
| *C02F 103/16* | (2006.01) |
| *C02F 101/22* | (2006.01) |
| *C02F 103/24* | (2006.01) |
| *C02F 103/30* | (2006.01) |

(52) U.S. Cl.
CPC .......... *C08B 37/003* (2013.01); *B01D 15/361* (2013.01); *B01J 20/24* (2013.01); *B01J 39/18* (2013.01); *C02F 1/288* (2013.01); *C02F 1/42* (2013.01); *C02F 2101/22* (2013.01); *C02F 2103/16* (2013.01); *C02F 2103/24* (2013.01); *C02F 2103/30* (2013.01); *C02F 2303/16* (2013.01)

(58) Field of Classification Search
CPC ...... C08B 37/003; B01D 15/361; B01J 20/24; B01J 39/18; C02F 1/42; C02F 1/288; C02F 2103/30; C02F 2101/22; C02F 2303/16; C02F 2103/16; C02F 2103/24
See application file for complete search history.

(56) References Cited

U.S. PATENT DOCUMENTS

2017/0002098 A1* 1/2017 Ayoub ..................... B01J 39/19

* cited by examiner

*Primary Examiner* — Taiwo Oladapo
(74) *Attorney, Agent, or Firm* — Don D. Cha; HDC IP Law, LLP

(57) ABSTRACT

The present invention provides phosphonium-crosslinked chitosan (PCC) and methods for using the same for removal of heavy metal-ion(s) from a solution as well as methods for producing said phosphonium-crosslinked chitosan.

18 Claims, 6 Drawing Sheets

PHOSPHONIUM-CROSSLINKED CHITOSAN AND METHODS FOR USING AND PRODUCING THE SAME

FIELD OF THE INVENTION

The present invention relates to phosphonium-crosslinked chitosan and methods for using the same for removal of heavy metal-ion(s) from a solution as well as methods for preparing the phosphonium-crosslinked chitosan.

BACKGROUND OF THE INVENTION

Heavy metal-ions, such as hexavalent chromium (Cr (VI)), are extremely hazardous to humans, animals, and the environment and as such the World Health Organization (WHO) mandated a maximum allowable concentration of these heavy metal-ions in water, for example, 50 ppb for Cr(VI) in water. Heavy metal-ions are produced by a wide variety of processes used in industry. For example, in manufacturing, electroplating, textile, and tannery industries through the combustion of coal and oil or as part of the waste in the process.

As an example, wastewater from tanneries may contain Cr(VI) concentrations upwards of 3,500 ppm. The majority of industries, however, generate wastewaters with Cr(VI) concentrations up to 100 ppm. Adsorption is a commonly used method for treating water and wastewater streams containing heavy metal-ions, such as Cr(VI), and most adsorbents for heavy metal-ions, including Cr(VI), and other anions, rely on nitrogen-based functional groups. Industrially, synthetic polymers are often used rather than naturally occurring materials for adsorbing heavy-metal ions, including Cr(VI), due to their greater adsorption capacities. Production of synthetic polymer based adsorbents itself produces undesirable wastes such as increase in carbon footprint and other industrial wastes.

Therefore, there is a need for economic environmentally friendly biomass-based adsorbents for removing heavy metal-ions from a solution.

SUMMARY OF THE INVENTION

Chitosan is an attractive adsorbent material because it is non-toxic and readily available because it is derived from chitin, which is found in fungi, insects, spiders, crustaceans, and other organisms. Chitin comprises a polymer of N-acetyl-D-glucosamine residues and is distinguished from polymeric carbohydrates by its nitrogen content. The nitrogen is bonded to acetyl groups that are removed through a deacetylation process to expose the amine functionalities required for adsorption and produce chitosan. Although the bonding to the amine groups is effective for some adsorbates, improvement may be achieved by further modification incorporating functional groups other than nitrogen, such as phosphonium. For example, clays modified with phosphonium sites were effective in removing organic waste from water, and phosphonium foams and nanoparticles were effective in removing Cr(VI) from water. In general, however, phosphonium groups have not been studied as extensively as amines and quaternary ammonium groups for adsorption.

There are several methods for imparting phosphonium functionality to a polymer, many of which involve multiple synthetic steps and relatively expensive raw materials. In contrast, one aspect of the invention provides a method for a one-step chemical reaction incorporating a low-cost phosphonium salt, e.g., tetrakishydroxymethyl phosphonium sulfate (THPS) or tetrakishydroxymethyl phosphonium halide (e.g., chloride, bromide or iodide). Such a method allows cost-effectively mass-produce phosphonium-crosslinked chitosan (PCC) that can be used to remove heavy-metal ions from a solution.

DETAILED DESCRIPTION OF THE INVENTION

A chitosan polymer modified by crosslinking and functionalized with phosphonium salt, e.g., tetrakishydroxymethylphosphonium sulphate ("THPS") or tetrakishydroxymethylphosphonium ("THP") halide, such as chloride, bromide or iodide. The resulting polymer, phosphonium-crosslinked chitosan (PCC), is an effective adsorbent for heavy metal-ions, such as Cr(VI), especially at low (<120 ppm) concentrations. Potential sources of heavy metal-ions include mining, tailings, industrial wastes, agricultural run-off, occupational exposure, paints and treated timber.

As used herein, the term "heavy metal-ion" refers to an ion in any oxidation state of chromium, mercury, lead, bismuth, gallium, thallium, hafnium, iron, cobalt, zinc, ruthenium, indium, antimony, arsenic, cadmium, cerium, copper, dysprosium, erbium, europium, gadolinium, germanium, gold, holmium, iridium, lanthanum, lutetium, manganese, molybdenum, neodymium, nickel, niobium, osmium, palladium, platinum, praseodymium, protactinium, rhenium, rhodium, samarium, selenium, silver, tantalum, tellurium, terbium, thorium, thulium, tin, tungsten, uranium, vanadium, ytterbium, and zirconium. Typically, when known, the oxidation state of the heavy metal-ion is provided in a parenthesis, e.g., Cr(VI), Cr(III), Hg(I), Hg(II), refer to chromium in +6 oxidation state, chromium in +3 oxidation state, mercury in +1 oxidation state (i.e., "mercurous ion"), and mercury in +2 oxidation state (i.e., "mercuric ion"), respectively.

For the sake of brevity and clarity, the present invention will now be described with regard to removing chromium, in particular, chromium (VI) ions, from waste water using phosphonium-crosslinked chitosan of the invention. However, it should be appreciated that the scope of the invention is not limited to removing Cr(VI) ions, but any heavy metal-ions can be removed using the methods and phosphonium-crosslinked chitosan disclosed herein.

Figure 2:
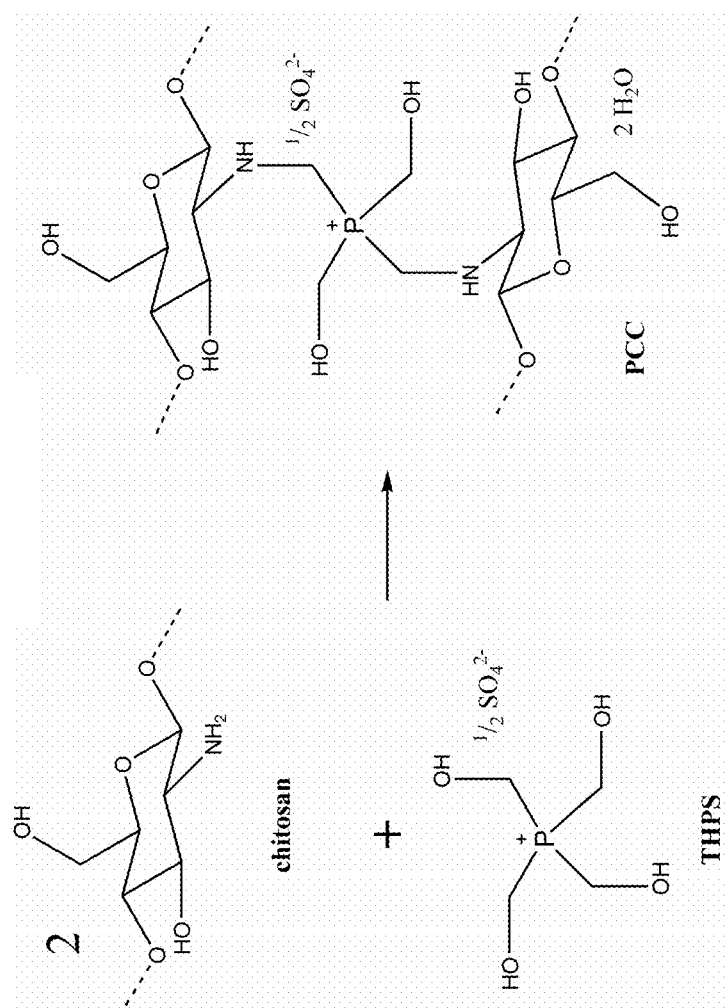
FIG. 2 is reaction scheme illustrating production of PCC from chitosan and THPS.

Phosphonium-crosslinked chitosan (PCC) of the invention can be produced in a one-pot synthesis procedure as illustrated in one particular embodiment of the invention in FIG. 2. Typically, chitosan is dispersed in an aqueous solution in a reaction vessel or a container. Suitable aqueous solutions include a mixture of water and one or more organic solvents that can form a homogenous mixture. Suitable solvents include dilute organic acid solutions with acetic acid, lactic acid, glycolic acid, citric acid, etc. Suitable solvents also include dilute mineral acid solutions with hydrochloric acid, sulfuric acid, phosphoric acid, etc. The pH of the acid solution is typically between about pH 1 and about pH 7, often between about pH 2 and about pH 6.9.

In one particular embodiment, chitosan is displaced or placed in an acetic acid solution. The concentration of acetic acid in water is not limited to any particular range, but generally, the concentration of acetic acid solution ranges from about 0.1 M to about 10 M, typically from about 0.5 M to about 5 M, often from about 1 M to about 3 M, and most often about 1 M. As used herein, the term "about" is not intended to limit the scope of the invention but instead encompass the specified material, parameter or step as well as those that do not materially affect the basic and novel characteristics of the invention. The term "about" or "approximately" as used herein refers to being within an acceptable error range for the particular value as determined by one of ordinary skill in the art, which will depend in part on how the value is measured or determined, i.e., the limitations of the measurement system, i.e., the degree of precision required for a particular purpose. For example, the term "about" can mean within 1 or more than 1 standard deviation, per the practice in the art. Alternatively, the term "about" when referring to a numerical value can mean±20%, typically ±10%, often ±5% and more often ±1% of the numerical value. In general, however, where particular values are described in the application and claims, unless otherwise stated, the term "about" means within an acceptable error range for the particular value.

The reaction vessel is also charged with a suitable phosphonium linking agent, such as, but not limited to, tetrakishydroxymethylphosphonium sulphate ("THPS"), tetrakishydroxymethylphosphonium chloride ("THP-Cl"), tetrakishydroxymethylphosphonium bromide ("THP-Br"), tetrakishydroxymethylphosphonium iodide ("THP-I"), tetrakishydroxymethylphosphonium acetate ("THP-$C_2H_3O_2$"), tetrakishydroxymethylphosphonium acetate-phosphate ("THP-$C_2H_3O_2$—$PO_4$"), tetrakishydroxymethylphosphonium borate ("THP-$BO_3$"), tetrakishydroxymethylphosphonium carbonate ("THP-$CO_3$"), tetrakishydroxymethylphosphonium citrate ("THP-$C_6H_7O_7$"), tetrakishydroxymethylphosphonium formate ("THP-CHOO"), tetrakishydroxymethylphosphonium lactate ("THP-$C_3H_5O_3$") and tetrakishydroxymethylphosphonium phosphate ("THP-$PO_4$") as well as others known to one skilled in the art. See, for example, U.S. Patent Application Publication No. 2012/0289436.

Chitosan used in preparation of PCC of the invention typically has about 50% or more degree of deacetylation (% DD), often about 60 or more % DD, more often about 70 or more % DD, and most often about 75 or more % DD. The amount of chitosan (g) used relative to the phosphonium linking agent (mL) ranges from about 0.1 g/1000 mL to about 0.1 g/500 mL, typically from about 0.1 g/500 mL to about 0.1 g/250 mL, often from about 0.1 g/250 mL to about 0.1 g/100 mL, and more often form about 0.1 g/100 mL to about 1 g/100 mL.

The resulting mixture is typically stirred and heated. It should be appreciated that stirring is not necessary but aids in reaction kinetics. Typically, the reaction temperature ranges from about 30° C. to about 100° C. or the boiling point of the solvent at standard pressure (i.e., 760 mm of Hg). Often the reaction temperature ranges from about 40° C. to about 90° C., more often from about 50° C. to about 80° C. In one particular embodiment, when acetic acid solution is used as a reaction solvent (e.g., 1 M in water), the reaction temperature is about 70° C.

The reaction time can vary widely depending on a variety of factors such as reaction temperature, concentration of each reagents, the solvent used, etc. Typically, the reaction time can range from about 10 min to about 5 hours, often from about 20 min to about 3 hours and more often from about 30 min to about 2 hours.

It should be appreciated, however, that the scope of the invention is not limited to any reaction temperature, concentration of reagent(s), or reaction time discussed herein. The values provided herein are merely for illustrative purposes.

The resulting reaction product can be purified using any of the methods known to one skilled in the art. Typically, the product is a solid. Accordingly, one can cool the reaction product to room temperature and repeatedly wash with a solvent to remove any unreacted phosphonium linking agent. Typically, water is used to remove unreacted phosphonium linking agent from the reaction product. In this manner, the amount of unreacted phosphonium linking agent in PCC of the invention is about 10% or less (w/w), typically about 5% or less, and often about 2% or less. Typically, the washing procedure involves dilution with a solvent (e.g., deionized water), followed by shaking or stirring, and separation of the solvent from the solid, e.g., by decanting. The resulting product can be further dried, e.g., in a desiccator under vacuum. Typically, the product is dried for at least one day, often for at least three days, more often for at least five days, and most often for at least seven days. In this manner, the amount of solvent or moisture present in the PCC is about 90% mole/g or less, typically about 50% mole/g or less, often about 25% mole/g or less and most often about 4% mole/g or less.

The phosphonium-crosslinked chitosan of the invention has the percentage of grafting of phosphonium-crosslinking of at least about 20%, typically at least about 25%, often at least about 30%, and more often at least about 35%. Under elemental analysis, the phosphonium-crosslinked chitosan of the invention has at least about 0.5% by weight, typically at least about 1.0% by weight, often at least about 1.5% by weight, and more often at least about 2.0% by weight of phosphorous atom. Alternatively, the phosphonium-crosslinked chitosan of the invention has the carbon-to-nitrogen mass ratio of at least about 6.0, typically at least about 6.5, and often at least about 7.0.

The equilibrium constant $K_L$ of the phosphonium-crosslinked chitosan of the invention at pH 6 (as determined using the procedure described in the Examples Section below) is at least about 0.05 L/mg, typically at least about 0.1 L/mg, often at least about 0.15 L/mg and most often at least 0.19 L/mg. Alternatively, $Q_{max}$ of the phosphonium-crosslinked chitosan of the invention is at least about 100 mg/g, typically at least about 110 mg/g, often at least about 120 mg/g, more often at least about 130 mg/g and most often at least about 140 mg/g.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

Examples

Materials:

Chitosan powder from shrimp shells (75+% DD), 70-75% (w/w) tetrakishydroxymethylphosphonium sulfate (THPS), potassium dichromate ($K_2Cr_2O_7$), magnesium sulfate anhydrous ($MgSO_4$), magnesium chloride hexahydrate ($MgCl_2 \cdot 6H_2O$), sulfuric acid ($H_2SO_4$), and glacial acetic acid were purchased from Sigma Aldrich. All solutions were prepared with deionized water.

Synthesis of PCC:

Chitosan (0.4 g) was dispersed in an acetic acid solution (1 M) in a 2 L beaker and THPS (100 mL) was added. The mixture was stirred on a hotplate with a magnetic stir bar at 320 rpm inside a fume hood and heated to 70° C. over 45 min. The mixture was stirred at this temperature for additional 30 min. The mixture was allowed to cool to room temperature over 1 h. and centrifuged (Thermo Scientific CL2 centrifuge) for 10 min at 5500 rpm. The supernatant was decanted and discarded while deionized water was added to the solids, followed by shaking at 250 rpm and 20° C. (VWR Orbital Incubating Shaker). The washing procedure (dilution, shaking, centrifuging, and decanting as described above) was repeated four more times to remove unreacted THPS. The washed solids were then dried in a desiccator under vacuum for one week before being ground in a ball mill (SPEX SamplePrep 8000M Mixer/Mill High-Energy Ball Mill). The resulting PCC powder was sieved to obtain particles in the size range of 20-150 μm. A sample of chitosan was also sieved to obtain particles in the same size range (i.e., 20-150 μm).

Characterization of Polymers:

Elemental analysis was performed using a combination of carbon, hydrogen and nitrogen (CHN, Perkin Elmer 2400 CHN instrument) combustion analysis and X-Ray Fluorescence (XRF, Rigaku ZSXmini II X-Ray Spectrometer along with Rigaku ZSX Version 3.26 software) to determine the phosphorus and sulfur contents. The XRF instrument was used to detect the mass ratios. Iron (III) oxide ($Fe_2O_3$) and nickel (II) oxide (NiO) were used as internal standards by adding either $Fe_2O_3$ or NiO (0.1 g) to each sample (0.1 g) before analysis.

The degree of deacetylation (% DD) of the chitosan was determined from the results of the CHN elemental analysis. Unlike THPS, chitosan contains nitrogen. Therefore, the ratio of the nitrogen concentrations in chitosan and PCC provided by elemental analysis can be used to calculate the percentage of grafting G (%) as per Eq. (1), where $C_{N,chitosan}$ (w/w) is the mass percentage of nitrogen in chitosan and $C_{N,PCC}$ (w/w) is the mass percentage of nitrogen in PCC.

$$G (\%)=100\times((C_{N,chitosan}/C_{N,PCC})-1) \quad \text{(Eq. 1)}$$

Milled samples of chitosan and PCC were analyzed by attenuated total reflection Fourier-transform infrared (ATR-FTIR) spectroscopy using an FTIR spectrometer (Nicolet iS50, Thermo Fisher Scientific).

Kinetics:

Standard solutions with various Cr(VI) concentrations were prepared, shaken, centrifuged, and then analyzed using Spectro Arcos Inductively Coupled Plasma Atomic Emission Spectroscopy (ICP). These solutions were also filtered through 0.45-micron filters (VWR) before analysis, which verified that the filtering did not change the solution concentrations.

To determine the time required to achieve equilibrium, multiple samples of PCC were immersed in solutions containing 100 ppm Cr(VI). The samples had a pH of 6, and were shaken at 280 rpm and 20° C. Periodically, a sample was analyzed by ICP to determine the amount of Cr(VI) adsorbed, as per Eq. (2), where the $q_e$ (mg/g) is the amount adsorbed at equilibrium, $C_0$ (100 mg/L) is the initial Cr(VI) concentration, $C_e$ (mg/L) is the equilibrium Cr(VI) concentration, V (0.005 L) is the total solution volume, and m (0.01 g) is the mass of the adsorbent. ICP tests were calibrated using SCP SCIENCE Multi-Element Calibration Standards. The kinetic experiments were performed twice, using the two different batches of PCC.

$$q_e=(C_0-C_e)V/m \quad \text{(Eq. 2)}$$

Cr(VI) Equilibrium Adsorption:

Prior to testing the adsorption capacity of PCC, whether THPS alone could reduce the Cr(VI) concentration via flocculation or another method was determined. THPS (0.1 mL) was mixed with Cr(VI) to give a 50 ppm Cr(VI) solution. The mixture was shaken for 48 h (250 rpm, 20° C.). Then the Cr(VI) concentration was measured using ICP.

Cr(VI) adsorption isotherms were obtained for chitosan and PCC, both at pH 3 and pH 6 with initial Cr (VI) concentrations of 25-800 ppm. The pH of the solutions was adjusted using sulfuric acid ($H_2SO_4$). The same adsorbent loading (i.e., 0.01 g in 15 mL of solution) was used for every test, and experiments were conducted in glass vials (22 mL) shaken for 48 h (280 rpm, 20° C.) before analysis by ICP.

Additional experiments were performed using solutions containing magnesium and chloride ions to simulate the harder water that may be used in practice. A concentrated magnesium chloride stock solution was prepared by dissolving 5.38 g $MgCl_2 \cdot 6H_2O$ in 1 L deionized water. Adsorption experiments were repeated with 50 ppm and 100 ppm Cr(VI) and 2 mL of the stock solution (a concentration of 0.717 g/L $MgCl_2 \cdot 6H_2O$, or 250 ppm chlorides). Duplicate experiments were performed and Welch's t-test used to determine if there was a statistically significant difference between the mean adsorption in distilled versus moderately hard water.

The kinetics and equilibrium adsorption experiments were performed in triplicate. All other experiments were duplicated.

Regeneration:

Samples of PCC (0.2 g) were mixed with 1000 ppm Cr(VI) solution (300 mL) in a 2 L glass beaker and stirred with a PTFE magnetic stir bar at 100 rpm (48 h, 20° C.). The mixture was then filtered with a Buchner funnel and the Cr(VI)-saturated PCC was collected and dried in a muffle furnace at 50° C. over 36 h. The Cr(VI)-saturated PCC samples (0.01 g) were then immersed in one of the regenerating solutions: $H_2SO_4$ (0.5 M), NaOH (1.0 M), $MgSO_4$ (0.5 M), $MgCl_2$ (0.5 M), and blank water as a control (15 mL). The ratio of the volume of regenerant solution to the mass of Cr(VI)-saturated PCC was always maintained at 1.5 L/g. All tests were performed in duplicate, using two different batches of PCC. Regeneration with MgSO$_4$ was done over one cycle but with a drying time of only 12 h.

The phosphorus content in the regenerant solution was measured using ICP to detect any degradation of PCC. In addition, the Cr(VI)-saturated PCC was analyzed with CHN combustion elemental analysis to determine the amount of PCC in the samples and if any phosphorus had been released. The oxidation state of the recovered chromium in the solution was determined with Ultraviolet-Visible spectrophotometry (UV-Vis, Thermo Scientific Evolution 220 UV-Visible Spectrophotometer).

Results and Discussion

Synthesis of PCC:

If aqueous solutions of dispersed chitosan or THPS were individually heated to 70° C., no observable precipitate formed in either beaker but when mixed together and heated, a gel precipitated, namely, phosphonium crosslinked chitosan or PCC. Two batches of PCC were synthesized and the average elemental analyses are given in Table 1. The standard errors were equal to or lower than 1% (w/w) for all elements, demonstrating good reproducibility.

TABLE 1

Elemental analysis for chitosan and PCC with standard errors.

| | Chitosan | | PCC | | |
|---|---|---|---|---|---|
| Element | % w/w | mmol/g | % w/w | mmol/g | Analysis |
| C | 39.3 ± 0.0 | 32.7 ± 0.0 | 33.5 ± 1.0 | 27.9 ± 0.8 | CHN |
| H | 7.3 ± 0.1 | 72.5 ± 1.1 | 6.5 ± 0.2 | 64.0 ± 1.8 | |
| N | 7.0 ± 0.0 | 5.0 ± 0.0 | 4.7 ± 0.1 | 3.4 ± 0.1 | |
| P | — | — | 2.3 ± 0.1 | 0.7 ± 0.0 | XRF |
| S | — | — | 1.5 ± 0.2 | 0.5 ± 0.1 | |
| O | 46.4 ± 0.2 | 29.0 ± 0.1 | 51.5 ± 1.0 | 32.2 ± 0.6 | by difference |

The chitosan contained about 40 wt % C, about 7 wt % H and about 7 wt % N with the remainder assumed to be oxygen. The PCC contained less C, H and N than chitosan, and also about 2.3 wt % P and about 1.5 wt % S. The balance of oxygen was higher (about 52 wt % versus about 46 wt %) in PCC than in chitosan. Monomers on average contain 4.3 oxygen atoms, excluding terminal monomers, which corresponds to a carbon-to-oxygen mass ratio of 1.1:1. The actual mass ratio was 0.8 suggesting that the dehydration was not complete. Others have shown that conventional methods, which include oven drying, are not able to completely dehydrate chitosan. In PCC, incomplete reaction of the hydroxyls in THPS would also increase the oxygen content. For PCC, the carbon-to-nitrogen mass ratio was about 7.1, compared to about 5.6 in chitosan, which corresponds to 74.0±2.0% DD (degree of deacetylation). Assuming that the weight contribution of unreacted THPS in PCC was minimal because of the extensive washing of PCC following synthesis, the G (%) (percentage of grafting) of about 49±3% for PCC suggested that phosphonium groups were successfully grafted onto chitosan.

Figures 1A, 1B:
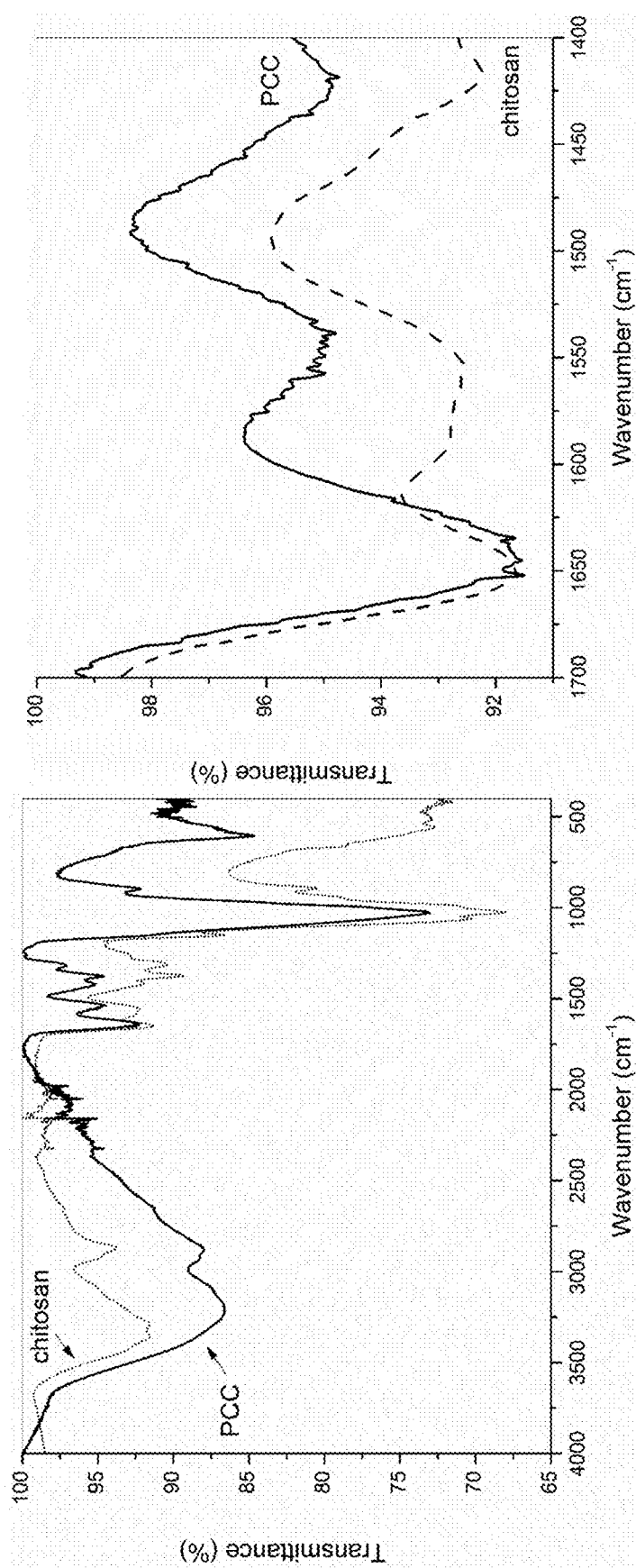
FIG. 1A is an FTIR spectra of PCC and chitosan in the 400-4000 $cm^{-1}$ range with an inset of the 1700-1400 $cm^{-1}$ range.
FIG. 1B is an FTIR spectra of PCC and chitosan in the 1700-1400 $cm^{-1}$ range.

FTIR spectra of the chitosan and PCC are shown in FIGS. 1A and 1B. The spectra for the two batches of PCC are overlaid, further confirming the reproducibility of the synthesis method. The absorbance in the region from 4000-3200 cm$^{-1}$ represents O—H and N—H bond vibrations. PCC has less transmittance in this region than chitosan, likely because of extra moisture. Other common features in the spectra of chitosan and PCC include: aliphatic C—H bonds at 3000-2800 cm$^{-1}$, C═O bonds at ~1650 cm$^{-1}$, C═O bonds of the acetyl groups at 1650-1640 cm$^{-1}$, H—C—H bending vibrations at 1500-1200 cm$^{-1}$, C—O—C bonds at 1000 cm$^{-1}$. The absorbance at 605 cm$^{-1}$ in the PCC spectrum corresponds to P—C bonds. Peaks for sulfate (S═O bond) may be hidden and/or combined with other peaks in the region of 1420-1000 cm$^{-1}$. The absorbances in the chitosan spectrum present between 3400-3250 cm$^{-1}$ represent primary and secondary amines. In PCC, these features are not clearly resolved, and are likely obscured by the broad O—H absorbance in this region. At ~1590 cm$^{-1}$, there is a distinct difference in the spectra. The spectrum for chitosan contains a shoulder representing primary amines (identified in FIG. 1B). For PCC, this shoulder is lacking, consistent with the primary amines becoming secondary amines when bonded to THPS (FIG. 1A). Also, the intensity of the N—H bonds (1575-1400 cm$^{-1}$) is lower in PCC, which, with the other differences in the FTIR spectra and the elemental analysis (Table 1), is consistent with chemical bonding to THPS.

Kinetics:

Adsorption equilibrium on PCC was reached in ~30 min (FIG. 3), which is comparable to the time reported previously for Cr(VI) adsorption on chitosan. All ICP measurements of standard solutions containing different Cr(VI) concentrations produced a percent relative error of about 5% or less, with or without filtering (i.e., the adsorbate concentration was not changed by the filtering).

Figure 3:
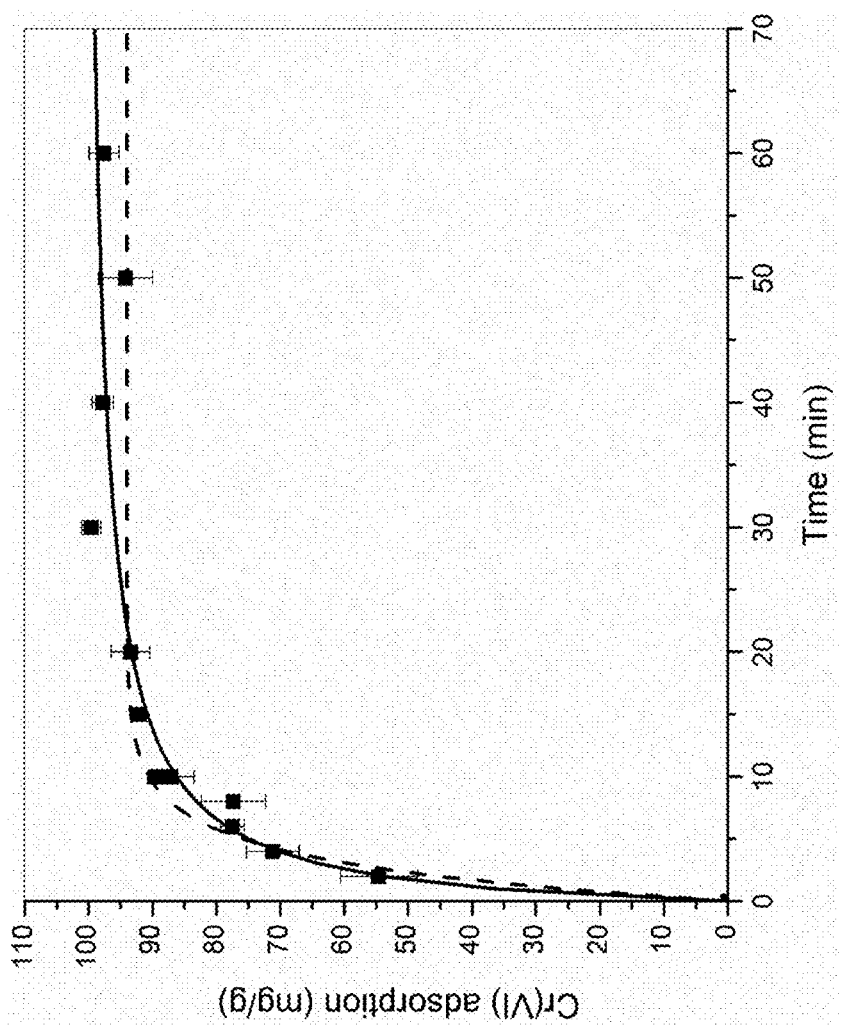
FIG. 3 is a graph showing Cr(VI) adsorption versus time for PCC obtained at pH 6 and 20° C. with an initial Cr(VI) concentration of 100 ppm. The solid line is the pseudo-second-order kinetic rate model.

The pseudo-second-order model (Eq. (3)) has been used to model Cr(VI) adsorption kinetics. In this model, k (g min$^{-1}$) is the kinetic rate constant, $q_e$ (mg/g) is the equilibrium adsorption, and $q_t$ (mg/g) is the adsorption amount at time t (s). The fit to the adsorption data is shown in FIG. 3, and the obtained parameters are given in Table 2 with those of other adsorbents reported in the literature for Cr(VI) adsorption. The conditions for the experiments varied but generally the adsorption on PCC was as fast, or faster, than the other adsorbents. The rate of adsorption on the silane nanoparticles was faster but the pH was lower and the temperature higher. In addition, diffusion is expected to decrease on the smaller particles. Consistent with the latter point, the adsorption rates for PCC were approximately one order of magnitude greater than that on the larger Purolite resins but similar to that on an acid-treated commercial activated carbon powder. Purolite A-400 and Purolite A-850 are commercial anion exchange resins that have quaternary ammonium functional groups rather than phosphonium functional groups and are not chitosan-based.

$$q_t = \frac{q_e^2 kt}{1 + q_e kt} \qquad \text{(Eq. 3)}$$

TABLE 2

Pseudo-second-order kinetic constants (k) for adsorption of Cr(VI) on various adsorbents and the adsorption conditions.

| Adsorbent | Initial conc (ppm) | Particle size (μm) | Temp. (° C.) | pH | k (g mg$^{-1}$ min$^{-1}$) |
|---|---|---|---|---|---|
| Purolite A-400 | 104 | 300-1200 | 20 | 5.3 | 0.00061 |
| Purolite A-850 | 104 | 300-1200 | 20 | 5.3 | 0.00053 |
| Acid-treated activated carbon | 50 | powder | 30 | 5 | 0.0053 |

TABLE 2-continued

Pseudo-second-order kinetic constants (k) for adsorption of Cr(VI) on various adsorbents and the adsorption conditions.

| Adsorbent | Initial conc (ppm) | Particle size (μm) | Temp. (° C.) | pH | k (g mg$^{-1}$ min$^{-1}$) |
|---|---|---|---|---|---|
| Phosphonium-silane magnetic nanoparticles | 100 | 0.008-0.015 | 25 | 3 | 0.0082 |
| PCC | 100 | 20-150 | 20 | 6 | 0.0056 |

Equilibrium Adsorption:

Blank runs with solutions of THPS only confirmed that these solutions did not remove Cr(VI). The adsorption isotherms for chitosan and PCC at pH 6 are given in FIG. 4A, while the isotherms at pH 3 and pH 6 are given in FIG. 4B. The error bars represent the 95% confidence interval. For equilibrium concentrations up to about 120 ppm, PCC adsorbed as least twice as much Cr(VI) as chitosan with no overlap between the error bars. At low equilibrium concentrations (<20 ppm), the performance of PCC was almost an order of magnitude better than that of chitosan. For example, at an equilibrium concentration of about 17 ppm, the adsorption capacities were about 92 mg/g and about 14 mg/g, respectively.

Figures 4A, 4B:
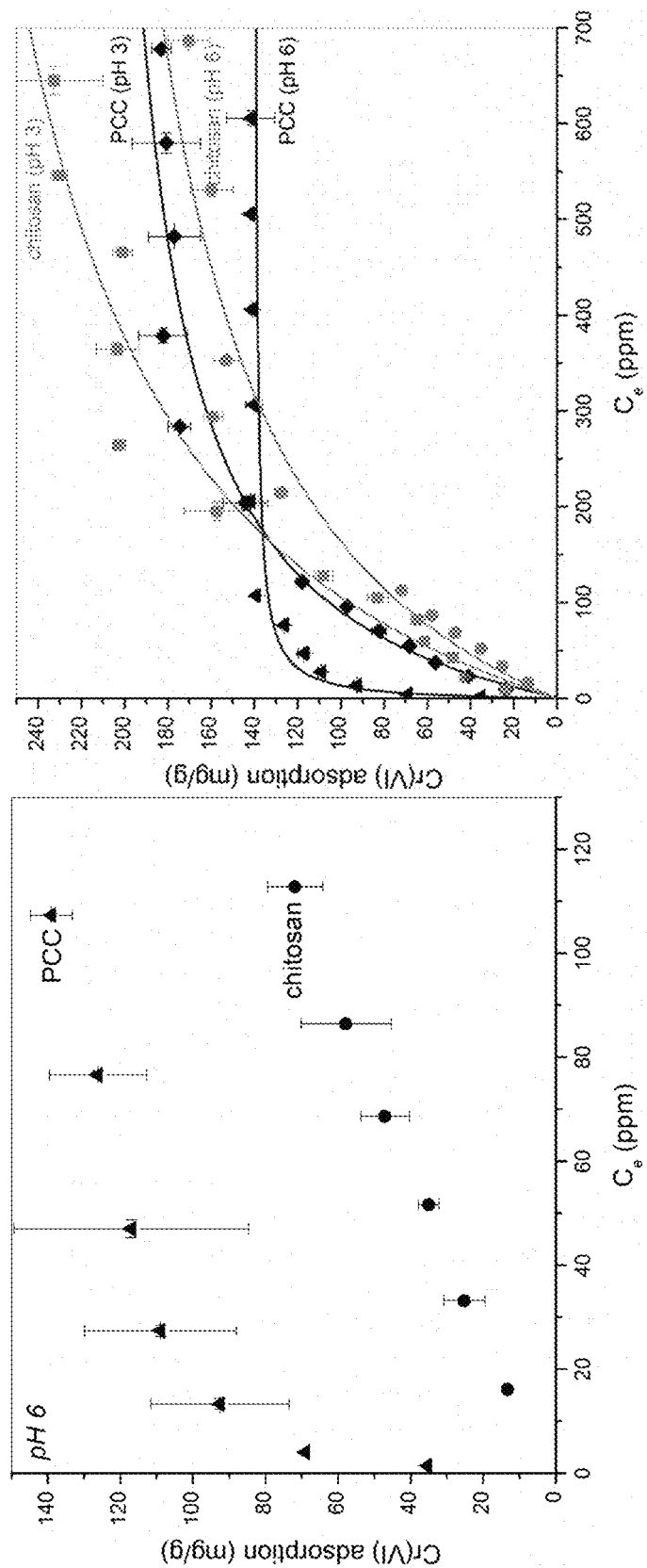
FIG. 4A is a graph showing adsorption isotherms at 20° C. for Cr(VI) adsorption on PCC and chitosan at pH 6 and equilibrium concentrations up to 120 ppm. Error bars represent 95% confidence intervals.
FIG. 4B is a graph showing adsorption isotherms at 20° C. for Cr(VI) adsorption on PCC and chitosan at pH 3 and pH 6 and equilibrium concentrations up to 700 ppm. Error bars represent standard errors.

At higher equilibrium concentrations (>about 150 ppm), chitosan has a higher adsorption capacity than PCC at both pH 3 and pH 6. FIG. 4B. These isotherms were fit with the Langmuir (Eq. (4)) equations in which $q_e$ is the amount adsorbed per mass of sorbent (mg/g), $C_e$ is the equilibrium concentration of the adsorbate remaining in solution (mg/L), and $K_L$ is the equilibrium constant (L/mg). The resulting parameters for the fitting are listed in Table 3 with those for other adsorbents. The adsorption was consistently higher at pH 3 for both adsorbents. At this pH, the adsorption may be affected by Jones oxidation and include the adsorption of Cr(III). Jones oxidation involves the oxidation of hydroxyls to ketones, aldehydes, and carboxylic acids, while Cr(VI) is reduced to Cr(III). Chitosan adsorbs Cr(III) ($Q_{max}$=30 mg/g). Thus, experiments performed in acidic environments likely misrepresent Cr(VI) adsorption capacities because of Jones oxidation and the higher adsorption capacity due to the protonation of amine functional groups.

$$q_e = \frac{Q_{max} K_L C_e}{1 + K_L C_e} \quad \text{(Eq. 4)}$$

At pH 3, the adsorption capacity of chitosan was about 324±21 mg/g (Table 4), which is higher than those reported by others (154 mg/g and 77 mg/g).

Without being bound by any theory, it is believed that the $Q_{max}$ is not dictated by the nature of the functional group. For example, PCC ($Q_{max}$=140 mg/g) and phosphonium-silane modified magnetic nanoparticles ($Q_{max}$=35.2 mg/g) possess phosphonium functional groups, yet their adsorption capacities are very different. In another example, a polystyrene-divinylbenzene (PS-DVB) resin functionalized with quaternary ammonium groups had a $Q_{max}$ of 178.6 mg/g. The chitosan grafted with quaternary ammonium functional groups using 2-hydroxyethyltrimethyl ammonium chloride demonstrated a $Q_{max}$ of 204 mg/g with a $K_L$ of 2.88 L/mg (90% DD). Presumably, had the DD of the chitosan used in this thesis been greater than 74%, PCC would have exhibited greater adsorption capacity, possibly approximating that of chitosan grafted with 2-hydroxyethyltrimethyl ammonium chloride.

Although chitosan exhibited a higher $Q_{max}$ than PCC (FIG. 4B), the $K_L$ of PCC was 0.19 L/mg while the $K_L$ of chitosan was only 0.0043 L/mg (pH 6). Table 4. Industrial wastewater streams tend to contain Cr(VI) concentrations in the 0-100 ppm range—the superior adsorption performance of PCC in this range is attributed at least in part to its higher $K_L$.

TABLE 3

Langmuir constants for various Cr(VI) adsorbents at temperatures between 20-30° C.

| Adsorbent | Functional group | Matrix | Particle size (mm) | pH | $Q_{max}$ (mg/g) | $K_L$ (L/mg) |
|---|---|---|---|---|---|---|
| Chitin | acetamido | chitin | n/a | 3 | 70.4 | 0.00967 |
| Chitosan | amine | chitosan (n/a DD) | n/a | 3 | 154 | 0.00598 |
| chitosan | amine | chitosan (61% DD) | <0.25 | 3 | 76.9 | 0.00342 |
| chitosan with 2-hydroxyethyltrimethyl ammonium chloride | quaternary ammonium | chitosan (90% DD) | n/a | 4 | 204 | 2.88 |
| ethylenediamine-modified cross-linked magnetic chitosan | amine | chitosan (90% DD) | <0.3 | 2 | 51.8 | 0.583 |
| cellulose grafted with D-glucose | n/a | cellulose | powder | 4 | 54.6 | 1.11 |
| Purolite A-400 | quaternary ammonium | PS - DVB | 0.3-1.2 | 5.3 | 120.0 | 0.0846 |
| Purolite A-850 | quaternary ammonium | PS - DVB | 0.3-1.2 | 5.3 | 95.2 | 0.0916 |
| activated carbon (hazelnut) | n/a | n/a | 1.25-1.40 | 3 | 52.2 | 0.0102 |
| activated carbon (acid-treated, commercial) | n/a | n/a | powder | 1.5 | 71.4 | 4.1 × 10$^{-5}$ |
| Chitosan | phosphonium | chitosan (74% DD) | 0.02-0.15 | 3 | 140 | 0.19 |

TABLE 3-continued

Langmuir constants for various Cr(VI) adsorbents at temperatures between 20-30° C.

| Adsorbent | Functional group | Matrix | Particle size (mm) | pH | $Q_{max}$ (mg/g) | $K_L$ (L/mg) |
|---|---|---|---|---|---|---|
| Chitosan | phosphonium | chitosan (74% DD) | 0.02-0.15 | 6 | 140 | 0.19 |
| PCC | phosphonium | chitosan (74% DD) | 0.02-0.15 | 3 | 140 | 0.19 |
| PCC | phosphonium | chitosan (74% DD) | 0.02-0.15 | 6 | 140 | 0.19 |

TABLE 4

Langmuir constants for PCC and Chitosan at pH 3 and pH 6.

| | $Q_{max}$ (mg/g) | $K_L$ (L/mg) | RMSE | $K_f$ | n | RMSE |
|---|---|---|---|---|---|---|
| PCC | | | | | | |
| pH 6 | 140 ± 2 | 0.19 ± 0.02 | 7.2 | 63.4 ± 5.2 | 7.36 ± 0.83 | 14.24 |
| pH 3 | 221 ± 7 | 0.0092 ± 0.0009 | 10.8 | 16.6 ± 2.9 | 2.60 ± 0.20 | 17.46 |
| Chitosan | | | | | | |
| pH 6 | 243 ± 16 | 0.0043 ± 0.0007 | 12.3 | 6.2 ± 1.8 | 1.90 ± 0.18 | 19.31 |
| pH 3 | 324 ± 21 | 0.0043 ± 0.0006 | 16.9 | 8.8 ± 2.0 | 1.93 ± 0.014 | 20.92 |

Other factors that may lead to differences in adsorption capacity include, but are not limited to, matrix composition, particle size, porosity and surface area. For example, hydrophilic aliphatic matrices tend to favor anion adsorption. Disregarding the greater external surface area, smaller particles reportedly achieve higher adsorption capacities at equilibrium. Porosity and surface area of many polymeric sorbents increase unpredictably when hydrated in a solution. These properties can be extremely challenging to measure when the sorbent is immersed in solution and may fluctuate according to the nature of the solution.

The competitive performance of PCC was notable when comparing PCC to commercial resins, Purolite A-400 ($Q_{max}$=120 mg/g, $K_L$=0.0846 L/mg) and Purolite A-850 ($Q_{max}$=95.2 mg/g, $K_L$=0.0916 L/mg). However, the particle size of PCC (0.02-0.15 mm) was significantly smaller than that of the Purolite resins (0.3-1.2 mm).

Competing Ions:

ICP analysis of the magnesium chloride solution produced 252.8±1.1 ppm of chlorides and 92.3±0.4 ppm of magnesium, close to the calculated 84.6 ppm magnesium concentration expected to balance the chlorides.

For adsorption with an initial Cr(VI) concentration of 100 ppm, the value of zero was not encompassed by the 95% confidence interval (4.16-17.14 mg/g). These results indicate there is a statistically significant difference in adsorption when using distilled water versus moderately hard water. Similarly, for adsorption with an initial Cr(VI) concentration of 50 ppm, the value of zero was not encompassed by the 95% confidence interval (0.56-1.44 mg/g). Again, adsorption with distilled versus moderately hard water produced different results. According to the data, adsorption was slightly higher with the moderately hard water in 50 ppm and 100 ppm Cr(VI) experiments. The difference in adsorption, however, was only 1 mg/g (50 ppm) and 10.7 mg/g (100 ppm), respectively. Again without being bound by any theory, it is believed that the high chloride concentration may have displaced some sulfates on the ion exchange resin. Therefore, according to the selectivity series, adsorption sites with chloride counterions may have a higher affinity for Cr(VI) than sites with sulfate counterions.

Regeneration:

To normalize the desorbed Cr(VI) amount by the mass of PCC tested, according to CHN, PCC contained 4.7% nitrogen and Cr(VI)-saturated PCC contained 3.6% nitrogen; therefore, the Cr(VI)-saturated PCC was assumed to be composed of 77% PCC and 33% Cr(VI) adsorbates. The amount of phosphorus detected in solution was likely indicative of any degradation of PCC.

Since the ICP cannot measure the oxidation state of chromium, from this point forward in this disclosure, Cr(VI) will be referred to simply as chromium when its oxidation state is not confirmed. The ICP measurements showed that $H_2SO_4$ (0.5 M) recovered the most chromium, followed by NaOH (1.0 M), $MgSO_4$ (0.5 M), and $MgCl_2$ (0.5 M).

Since the $Q_{max}$ of PCC is 140 mg/g, desorbing 126.6 mg/g of chromium by using $H_2SO_4$ as the regenerant constitutes a 90.4% recovery of chromium. For reference, the blank water recovered 0.9% of chromium. However, the phosphorus released per gram of PCC regenerated using $H_2SO_4$ was 26.1 mg/g, higher than the 21.0 mg/g released when regenerating with NaOH. Using the other regenerants resulted in no detectable amount of phosphorus. The high phosphorus amount recovered using $H_2SO_4$ and NaOH was indicative of PCC degradation. More specifically, the strong $H_2SO_4$ solution is sufficiently acidic to hydrolyze chitosan into individual monomers. Therefore, similar deleterious effects could be experienced by PCC. Also, THPS (and therefore PCC) cannot come into contact with a solution with a pH greater than 8 or the phosphonium groups will be oxidized into a phosphine oxides. The NaOH regenerant clearly exceeded this pH limitation. Therefore, the best performing regenerant that did not degrade PCC was $MgSO_4$ (0.5 M), which recovered 23.7% of the adsorbed chromium.

Figure 5A:
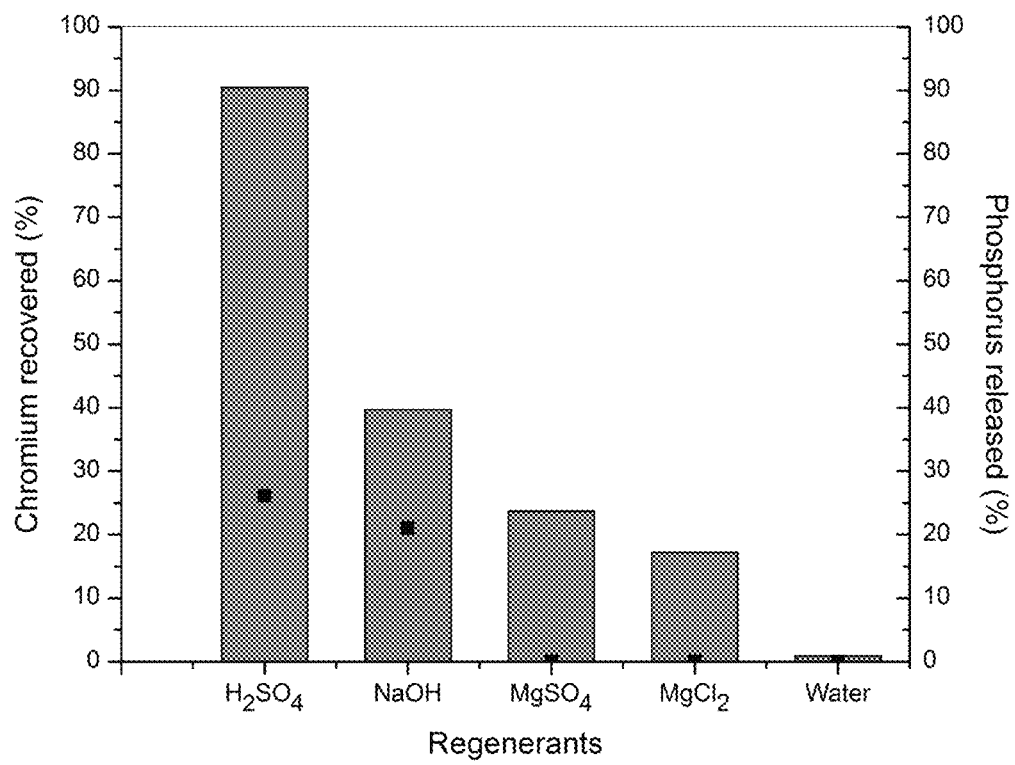
FIG. 5A is a bar graph showing chromium recovered (bars) and phosphorus released (points) by various regenerants from PCC saturated in 1000 ppm Cr(VI) solution, after 48 h at 20° C.
Figure 5B:
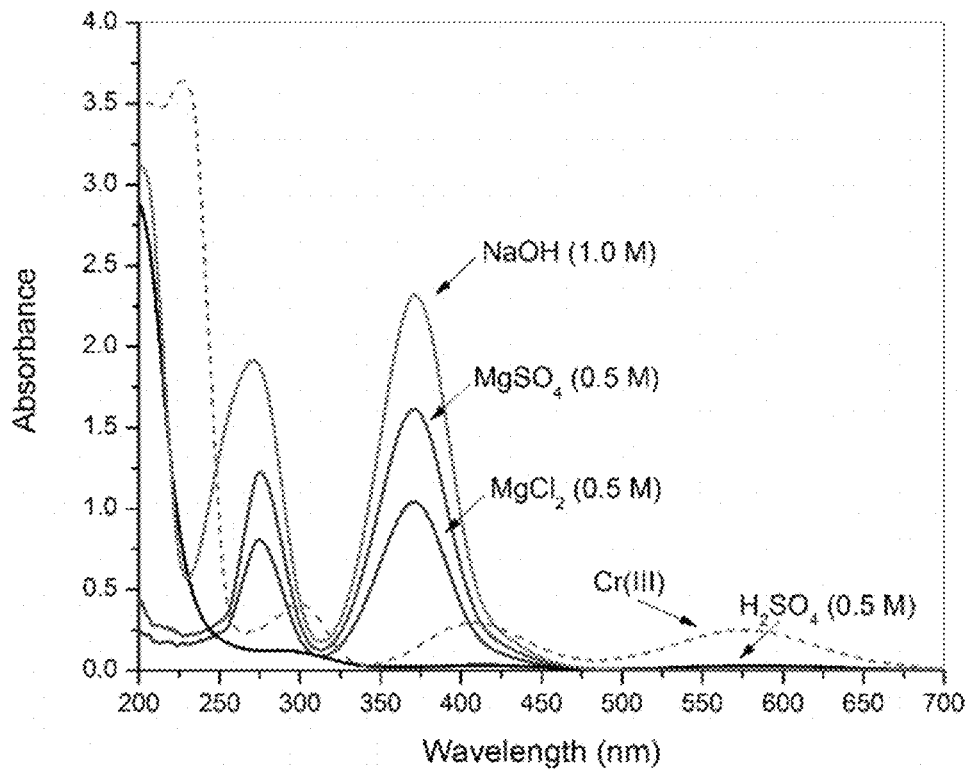
FIG. 5B is a UV-Vis spectra (200-700 nm) for the regenerant solutions after PCC regeneration.
Figure 5C:
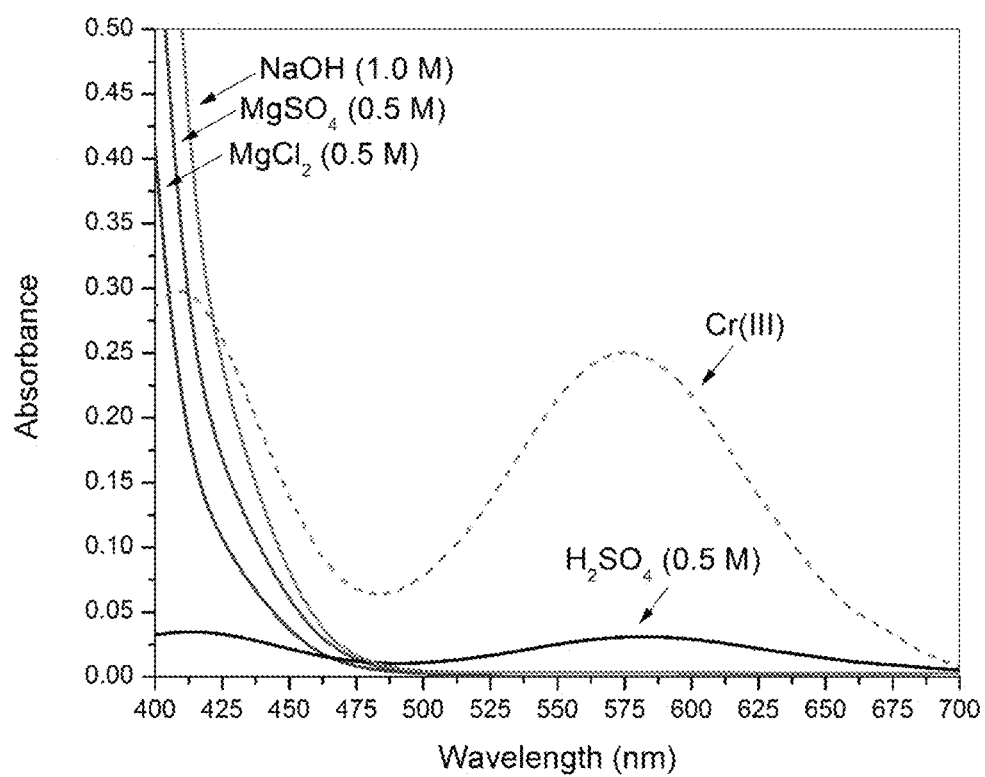
FIG. 5C is a UV-Vis spectra (400-700 nm) for the regenerant solutions after PCC regeneration.

PCC may be used to recycle Cr(VI), such as is necessary in a chrome plating process. Therefore, maintaining the oxidation state of Cr(VI) is desirable. UV-Vis analysis showed that NaOH, $MgSO_4$, and $MgCl_2$ recovered chromium as Cr(VI). FIGS. 5B-C. Also, the intensities of the absorbance peaks at λ~373 nm showed that NaOH recovered the most Cr(VI), followed by $MgSO_4$, and lastly $MgCl_2$. This trend was consistent with the ICP data for chromium recovery in The $H_2SO_4$ regenerant solution produced no absorbance peak at 373 nm. Instead, a peak at 575 nm indicated the presence of Cr(III). For reference, the UV-Vis spectra of 1000 ppm chromium (III) nitrate (Cr$(NO_3)_3$) was collected, showing the same peak at 575 nm that is characteristic of Cr(III). The $H_2SO_4$ decomposed the PCC, likely releasing Cr(VI) into solution along with PCC degradation products. Then, due to the very low pH of ~0.3 of the solution, Jones oxidation occurred—Cr(VI) was reduced to Cr(III) after oxidizing PCC hydroxyls into ketones, aldehydes, and carboxylic acids. Ostensibly, $H_2SO_4$ recovered the most chromium, but with ICP analysis of the phosphorus content and UV-Vis to confirm the oxidation state, $H_2SO_4$ was ultimately the worst regenerant. For the other regenerants, absorbance peaks at 575 nm were not visible; therefore, the NaOH, $MgSO_4$, and $MgCl_2$ seemed to produce no detectable amount of Cr(III). These regenerants were successful in recycling Cr(VI) without compromising its oxidation state. Of the four regenerants tested, $MgSO_4$ (0.5 M) showed the highest Cr(VI) recovery without degrading PCC, while also maintaining the oxidation state of Cr(VI).

PCC was tested for a second cycle of adsorption. The results showed that PCC could desorb 38 mg/g when regenerated using $MgSO_4$, compared with the 140 mg/g adsorption capacity (27% recovery). However, during the second cycle of adsorption, PCC adsorbed 36 mg/g, essentially re-adsorbing all the Cr(VI) that was previously desorbed during regeneration. The results ultimately demonstrated that PCC can adsorb Cr(VI), be partially regenerated, and then adsorb Cr(VI) again, fulfilling the function of an ion exchange resin.

Currently, chitosan costs about $20-30/kg; however, THPS is significantly less expensive. According to the elemental analysis, PCC was composed of 2.3% (w/w) of phosphorus, or 15.1% (w/w) THPS. Since the synthetic procedure is a relatively simple one-step reaction, manufacturing costs for PCC—along with the cost of raw materials—would be expected to remain below the cost of an equivalent amount of chitosan. Transportation costs would also be lower because of the significant reduction in mass transported.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A phosphonium-crosslinked chitosan (PCC), wherein said PCC has a percentage of grafting of phosphonium-crosslinking of at least 35% and wherein said phosphonium-cross linking moiety comprises tetrakishydroxymethylphosphonium sulfate.

2. The PCC of claim 1, wherein said PCC has at least 1.5% by weight of phosphorous atom.

3. The PCC of claim 1, wherein said PCC has the carbon-to-nitrogen mass ratio of at least 6.0.

4. The PCC of claim 1 having IR spectrum as shown in FIG. 1B.

5. A product produced from the process comprising:
   (i) admixing a reaction mixture comprising chitosan and tetrakishydroxymethylphosphonium ("THP") salt in the presence of an acid under reaction conditions sufficient to produce a crude phosphonium-crosslinked chitosan (PCC); and
   (ii) purifying the crude PCC to produce a purified PCC.

6. The product of claim 5, wherein said process further comprises drying the purified PCC.

7. The product of claim 5, wherein said step of purifying the crude PCC comprises:
   (a) diluting the crude PCC with a purification solvent to dissolve at least a portion of the unreacted THP salt, if any unreacted THP salt is present in the crude PCC;
   (b) removing the solvent, thereby removing at least a portion of unreacted THP salt from PCC, if any unreacted THP salt is present in the crude PCC; and
   (c) optionally repeating said steps (a) and (b).

8. The product of claim 7, wherein said purification solvent comprises water.

9. The product of claim 5, wherein said reaction conditions comprise heating said admixture to at least 50° C.

10. The product of claim 5, wherein said reaction conditions further comprises removing a supernatant from said reaction mixture to produce said crude PCC as a solid.

11. The product of claim 5, wherein said THP salt comprises tetrakishydroxymethylphosphonium halide ("THP halide") or tetrakishydroxymethylphosphonium sulfate (THPS).

12. The product of claim 11, wherein said THP halide is tetrakishydroxymethylphosphonium chloride ("THPC").

13. The product of claim 5, wherein the amount of THP salt used in the reaction is at least about 1 to about 30% by weight relative to the amount of chitosan.

14. A method for removing at least a portion of one or more heavy metal ions that is present in an untreated aqueous solution, said method comprising:
   contacting the aqueous solution with PCC of claim 1 under conditions sufficient to form a heavy metal ion-chelated-PCC; and
   removing said heavy metal ion-chelated-PCC from the aqueous solution to produce a treated aqueous solution, wherein the amount of heavy metal ions in the treated aqueous solution is lower than the amount of heavy metal ion in the untreated aqueous solution.

15. The method of claim 14 further comprising the steps of removing the heavy metal ion from said heavy metal ion-chelated-PCC to regenerate PCC.

16. The method of claim 14, wherein said heavy metal ion comprises chromium, mercury, lead, bismuth, gallium, thallium, hafnium, iron, cobalt, zinc, ruthenium, indium, antimony, arsenic, cadmium, cerium, copper, dysprosium, erbium, europium, gadolinium, germanium, gold, holmium, iridium, lanthanum, lutetium, manganese, molybdenum, neodymium, nickel, niobium, osmium, palladium, platinum, praseodymium, protactinium, rhenium, rhodium, samarium, selenium, silver, tantalum, tellurium, terbium, thorium, thulium, tin, tungsten, uranium, vanadium, ytterbium, zirconium, or a combination thereof.

17. The method of claim 16, wherein said heavy metal ion comprises chromium.

18. An ion exchange resin comprising a phosphonium-crosslinked chitosan of claim 1.

* * * * *